United States Patent [19]
Christie et al.

[11] Patent Number: 6,157,996
[45] Date of Patent: Dec. 5, 2000

[54] PROCESSOR PROGRAMABLY CONFIGURABLE TO EXECUTE ENHANCED VARIABLE BYTE LENGTH INSTRUCTIONS INCLUDING PREDICATED EXECUTION, THREE OPERAND ADDRESSING, AND INCREASED REGISTER SPACE

[75] Inventors: David S. Christie, Austin, Tex.; Uwe Kranich, Munich, Germany

[73] Assignee: Advanced Micro Devices, Inc., Sunnyvale, Calif.

[21] Appl. No.: 08/969,779

[22] Filed: Nov. 13, 1997

[51] Int. Cl.[7] .................................................. G06F 9/38
[52] U.S. Cl. .................... 712/218; 712/219; 712/215; 712/208; 712/234
[58] Field of Search .................................. 712/32, 24, 36, 712/1, 214, 215, 204, 208, 209, 210, 219, 234

[56] References Cited

U.S. PATENT DOCUMENTS

| | | |
|---|---|---|
| 4,044,338 | 8/1977 | Wolf . |
| 4,050,094 | 9/1977 | Bourke . |
| 4,385,352 | 5/1983 | Bienvenu . |
| 4,453,212 | 6/1984 | Gaither et al. . |
| 4,807,115 | 2/1989 | Torng . |
| 4,835,734 | 5/1989 | Kodaira . |

(List continued on next page.)

FOREIGN PATENT DOCUMENTS

| | | |
|---|---|---|
| 0 67667 | 12/1982 | European Pat. Off. . |
| 0259095 | 3/1988 | European Pat. Off. . |
| 0 369396 | 5/1990 | European Pat. Off. . |
| 0381471 | 8/1990 | European Pat. Off. . |
| 0 425410 | 5/1991 | European Pat. Off. . |
| 0459232 | 12/1991 | European Pat. Off. . |
| 0 467152 | 1/1992 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 486 Dx Microprocessor (referred as Intel) Analysis Techniques for Predicated Code.

Intel, "Chapter 2: Microprocessor Architecture Overview," 1994, pp. 2–1 through 2–4.

(List continued on next page.)

*Primary Examiner*—Meng-Ai T. An
*Assistant Examiner*—Mackly Monestime
*Attorney, Agent, or Firm*—Conley, Rose & Tayon; Lawrence J. Merkel

[57] ABSTRACT

A processor for executing computer instructions including, in one embodiment, a machine specific register (MSR) which includes a predicated execution field and an instruction decoder. The decoder is coupled to the MSR and configured to detect predicated execution information contained in the computer instruction and to include conditional execution information in the decoded instruction upon detecting an appropriate setting in the predicated execution field of the MSR. The processor further includes a first execution unit. The first execution unit is configured to detect and evaluate the conditional execution information in the decoded instruction and, if present, to execute the decoded instruction only if a condition represented by the conditional execution information is true. In another embodiment, the processor includes a standard register set and an extended register set, which includes the standard register set. The decoder is configured to search the computer instruction for an extended register indicator upon detecting an appropriate setting in the extended register field of the MSR. The decoder is further configured to fetch, upon detecting the extended register indicator, a value from a selected register within the extended register set. If the decoder detects the absence of extended register indicator, a value is fetched from a selected register where the selected register is within the standard register set. In another embodiment, the MSR includes a three register field and the decoder is configured to interpret the computer instruction as containing first and second source register operands and a destination operand if the instruction contains a three register indicator and the three register field is set appropriately.

22 Claims, 9 Drawing Sheets

U.S. PATENT DOCUMENTS

| | | |
|---|---|---|
| 4,858,105 | 8/1989 | Kuriyama et al. . |
| 4,926,322 | 5/1990 | Stimac . |
| 4,928,223 | 5/1990 | Dao et al. . |
| 4,972,338 | 11/1990 | Crawford . |
| 5,053,631 | 10/1991 | Perlman et al. . |
| 5,058,048 | 10/1991 | Gupta et al. . |
| 5,109,334 | 4/1992 | Kamuro . |
| 5,125,087 | 6/1992 | Randell . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,226,132 | 7/1993 | Yamamoto . |
| 5,274,834 | 12/1993 | Kardach . |
| 5,293,592 | 3/1994 | Fu et al. . |
| 5,321,836 | 6/1994 | Crawford . |
| 5,375,213 | 12/1994 | Arai . |
| 5,438,668 | 8/1995 | Coon et al. . |
| 5,471,593 | 11/1995 | Branigin ................................. 395/375 |
| 5,481,684 | 1/1996 | Richter . |
| 5,560,032 | 9/1996 | Nguyen . |
| 5,561,784 | 10/1996 | Chen . |
| 5,651,125 | 7/1997 | Witt et al. . |
| 5,758,116 | 5/1998 | Lee et al. ................................ 712/210 |
| 5,809,273 | 9/1998 | Favor et al. ............................ 712/210 |
| 5,838,984 | 11/1998 | Nguyen et al. .............................. 712/5 |
| 5,848,284 | 12/1998 | Sharangpani ................................ 712/1 |

OTHER PUBLICATIONS

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, Volume 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

Kathail et al., HPL Playdoh Architecture Specification: Version 1.0, Hewlett Packard, Computer Systems Laboratory, HPL–93–80, Feb., 1994, pp. 1–48.

Intel Microprocessors: vol. I, 1993, pp. 2–1, 2–18 to 2–26, 2–79 to 2–83 and 2–121 to 2–122.

Intel Microprocessors: vol. II, 1993, pp. 2–2, 2–19 to 2–26, 2–80 to 2–83 and 2–122.

IEEE Micro, vol. 13, No. 5, Oct. 1, 1993, pp. 24–36, Makato Awaga et al, "The VP 64–Bit Vector Coprocessor: A New Implementation of High–Performance Numerical Computation."

| Prefix 0-4 bytes (Optional) 102 | Opcode 1-2 bytes 104 | Mod R/M 0-1 byte (Optional) 106 | S-I-B 0-1 byte (Optional) 108 | Displacement 0,1,2,or 4 bytes (Optional) 110 | Immediate 0,1,2, or 4 bytes (Optional) 112 |
FIG. 1
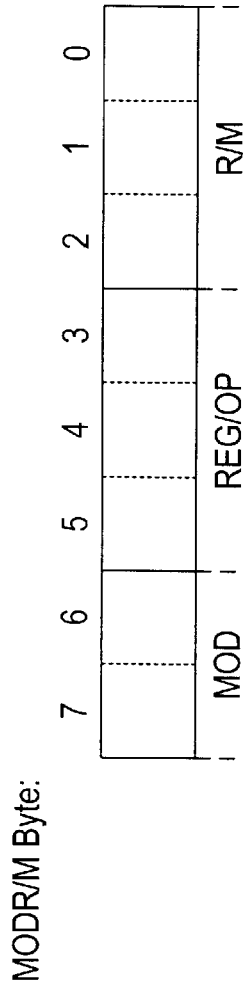
MODR/M Byte:
FIG. 2
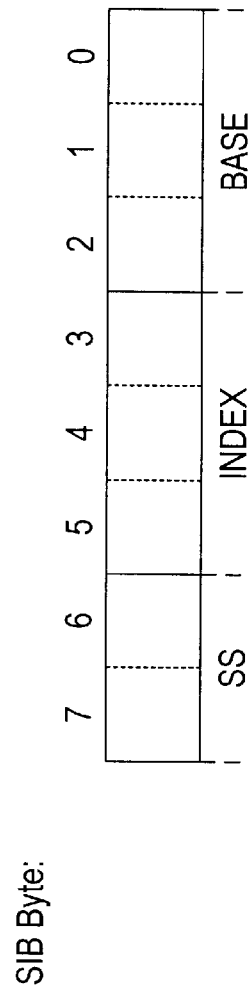
SIB Byte:
FIG. 3

| Prefix | Opcode | Modr/m | SIB |
|---|---|---|---|
| 4 | $px_3x_2x_1$ | | |

710

| p | $x_3$ | $x_2$ | $x_1$ | | |
|---|---|---|---|---|---|
| 0 | 0 | 0 | 0 | Non conditional execution | |
| 0 | 0 | 0 | 1 | CC1 | |
| 0 | 0 | 1 | 0 | CC2 | |
| 0 | 0 | 1 | 1 | CC3 | PFlags Not Updated |
| 0 | 1 | 0 | 0 | CC4 | |
| 0 | 1 | 0 | 1 | CC5 | |
| 0 | 1 | 1 | 0 | CC6 | |
| 0 | 1 | 1 | 1 | CC7 | |
| 1 | 0 | 0 | 0 | | |
| 1 | 0 | 0 | 1 | CC1 | |
| 1 | 0 | 1 | 0 | CC2 | |
| 1 | 0 | 1 | 1 | CC3 | PFlags Updated |
| 1 | 1 | 0 | 0 | CC4 | |
| 1 | 1 | 0 | 1 | CC5 | |
| 1 | 1 | 1 | 0 | CC6 | |
| 1 | 1 | 1 | 1 | CC7 | |

PROCESSOR PROGRAMABLY CONFIGURABLE TO EXECUTE ENHANCED VARIABLE BYTE LENGTH INSTRUCTIONS INCLUDING PREDICATED EXECUTION, THREE OPERAND ADDRESSING, AND INCREASED REGISTER SPACE

BACKGROUND OF THE INVENTION

1. Field of the Invention

The invention relates to the field of microprocessors and more particularly to microprocessor with an increased register space, three operand addressing, and predicated execution of instructions.

2. Description of the Relevant Art

The vast amount of software developed for prior x86 type microprocessor generations (i.e., the 8086/8, 80286, 80386, and 80486) places considerable pressure on manufacturers of microprocessors to maintain compatibility with previous generations. Compatibility is maintained by insuring that the new products execute the instruction set of the previous generations. Maintaining software compatibility, however, has forced many architectural compromises in newer products. In order to retain the functions of earlier products, hardware has often been simply modified or extended in order to increase capability and performance.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

FIGS. 2 and 3 illustrate the internal fields associated with the Mod R/M byte and of the SIB byte, respectively. References to a particular register of the x86 architecture may appear within the REG/OP or the R/M field of the Mod R/M byte, or within the index field and base field of the SIB byte. (A register address may alternatively be implied by an opcode.) Thus, there are four possible references to a register in an x86 instruction. The REG/OP and R/M fields in the Mod R/M byte can specify the source and destination registers, and the base and index fields in the SIB byte can specify the base and index registers used in operand address calculations for memory accesses.

Significant deficiencies exist in the x86 architecture. A first deficiency of the x86 architecture is the small number of general purpose registers. Typical RISC processors have at least thirty-two general purpose registers, as opposed to eight for the x86. A larger register set allows more operands to be kept in the faster-access register file, rather than having to fetch them from memory. Modem compilers are also able to take advantage of a larger number of registers to expose greater instruction level parallelism for increased superscalar execution performance. In addition to the limited number of x86 registers, use of them by the compiler is complicated by the fact that most have special implicit uses in various instructions. Expanding the number of registers would alleviate these limitations.

Another limitation of the existing x86 instruction is the inability to predicate execution of instructions. Predicated execution refers to a situation in which an instruction is executed if and only if a predicate condition is met, wherein the condition to be evaluated is part of the instruction itself. Predicated execution of instructions can increase performance of highly pipelined microprocessor architectures by minimizing branch misprediction and its attendant performance penalties. In a pipelined microprocessor architecture, the microprocessor is preparing and executing multiple instructions in each clock cycle. As an example, a simplistic microprocessor pipeline might include four stages: fetch, decode, execute, and writeback. During any given clock cycle, the microprocessor is fetching a first instruction from an instruction cache, decoding a second instruction, executing a third instruction, and writing back the results of a previously executed fourth instruction to a register file or a cache memory. To keep the pipeline filled, the processor must determine which instructions are most likely to be executed following the instruction that is currently executing. This determination is less than precise because computer programs typically do not execute instructions in a linear or otherwise predictable manner. Instead, a typical computer program includes at least one decision step in which the result of the decision step determines which instruction will execute next. Prior to the actual execution of such a decision step, the microprocessor must attempt to predict which step will be executed after the decision step. When the processor mispredicts (i.e., when the instruction predicted by the processor to be executed after the decision step turns out not to be the correct instruction), a performance penalty is paid in a pipelined processor because the pipeline must be cleared resulting in the occurrence of one or more no-op cycles. A no-op cycle, for purposes of this disclosure refers to a processor clock cycle during which no instruction is executed by the processor. As an example using the four stage pipeline proposed earlier, it is possible that the condition represented by a decision step is not fully evaluated until the fourth or writeback stage. In such an embodiment, misprediction requires that the instructions in the previous three stages of the pipeline be cleared. The performance penalty for misprediction increases as the number of stages in the pipeline increases. Accordingly, it is desirable to minimize the occurrence of misprediction in a pipelined processor without placing any significant restrictions on the ability of systems and applications programmers to insert decision steps in their code.

Still another limitation of the x86 architecture and instruction set is the inability of incorporate three register operands in a single instruction. The x86 instruction set allows, at most, two register operands to be used in a given instruction. In an instruction referencing two register operands, one of the register operands must serve as both a source operand and a target or destination operand. In certain applications, it would be advantageous to permit an instruction in which, for example, the contents of first and second source operands were manipulated and stored in a third register.

Accordingly, it would be advantageous to implement a microprocessor capable of operating in a mode compatible with pre-existing software and that further permitted instruction set extensions that increased the effective number of addressable registers, permitted predicated execution of any instruction, and allowed a three register operand addressing mode.

SUMMARY OF THE INVENTION

The problems identified above are in large part addressed by a microprocessor for executing computer instruction where the microprocessor includes, in various embodiments, facilities for increasing the addressable register space, conditionally executing instructions based upon predicate information contained in the computer instruction, and a facility for operating in a three register operand mode in which the instruction operands include a first and second source operand as well as a third destination operand.

Broadly speaking, the present invention contemplates a processor for executing a computer instruction. The processor includes a machine specific register (MSR). The MSR includes a predicated execution field. The processor further includes an instruction decoder adapted to receive the computer instructions and to produce a decoded instruction upon receiving the computer instruction. The decoder is coupled to the MSR and the decoder is configured to search the computer instruction for predicated execution information upon detecting an appropriate setting in the predicated execution field. The decoder is further configured to include, upon detecting the predicated information in the computer instruction, conditional execution information in the decoded instruction. A first execution unit of the processor is configured to receive and execute the decoded instruction from the instruction decoder. The first execution unit is coupled to the MSR and configured to detect and evaluate the conditional execution information in the decoded instruction in response to detecting the appropriate setting in the predicated execution field of the MSR. The first execution unit is configured to execute the decoded instruction only if a condition represented by the conditional execution information is true. In one embodiment, a byte length of the computer's instruction is variable and the instruction decoder is configured to determine a beginning byte and an ending byte of the variable length computer instruction. In one embodiment, the predicated execution information is contained within a beginning byte of the computer instruction. In the presently preferred embodiment, the predicated execution field of the MSR consists of a single conditional execution bit wherein the execution information is included in the decoded instruction if the conditional execution grid is set. In one embodiment, the processor further includes at least one predicate FLAG. In this embodiment, the first execution unit is configured to set or clear the predicate FLAG to reflect a characteristic of a result produced by the execution of the decoded instruction if a predicate FLAG field within the MSR is set appropriately. Preferably, the predicate FLAG field consists of a predicate FLAG bit where the status of the predicate FLAG bit determines whether the execution unit sets or clears the predicate FLAG upon executing the decoded instruction. In one embodiment, the truth of the condition depends upon the state of the predicate FLAG prior to the execution of the computer instruction. In other words, the truth of the condition depends upon the state of the predicate FLAG which was set during the execution of a previous computer instruction.

The present invention still further contemplates, in another embodiment, a processor for executing a computer instruction including at least one register operand field. In this embodiment, the processor includes a standard register set, an extended register set, an MSR, and an instruction decoder. The standard register set includes a first plurality of registers. The extended register set includes the standard register set as well as a second plurality of registers. The MSR includes an extended register field. The instruction decoder is adapted to receive the computer instruction and produce a decoded instruction suitable for execution in response to receiving the computer instruction. The decoder is coupled to the MSR and the decoder is configured to search the computer instruction for an extended register indicator upon detecting an appropriate setting in the extended register field of the MSR. The decoder is further configured to fetch, upon detecting the extended register indicator, a register from a selected register within the extended register set. The decoder is further configured to fetch, upon detecting the absence of the extended register indicator, a value from a selected register within the standard register set. In one embodiment, the byte length of the computer instruction is variable and the instruction decoder is configured to determine a beginning and ending byte of the computer instruction. Preferably, the extended register field consists of an extended register bit. The status of the extended register bit in this embodiment determines the appropriate setting of the extended register field. In one embodiment, the selected register is determined by standard and extended register address information contained in the instruction when the extended register indicator is present in the computer instruction. The selected register is determined solely by the standard register information when the extended register indicator is absent from the computer instruction. In one embodiment, the standard register information is contained in a MODR/M byte following an opcode byte of the computer instruction and the extended register information is contained within an extended register byte following the MODR/M byte of the computer instruction. In a presently preferred embodiment, the standard register information is contained within a three bit field of the MODR/M byte and the extended register information is contained in a two bit field of the extended register byte.

In another embodiment, the present invention contemplates a processor for executing a computer instruction including at least one register operand field. In this embodiment, the processor includes a register set, a machine specific register, and an instruction decoder. The MSR includes a three register field. The decoder is adapted to receive the computer instruction and produce a decoded instruction suitable for execution and response thereto. The decoder is coupled to the MSR and the decoder is configured to search the computer instruction for a three register indicator upon detecting an appropriate setting in the three register field of the MSR. The decoder is further configured to interpret, upon detecting the three register indicator, the computer instruction as containing first and second source operands as well as a destination operand. The decoder is configured to fetch values from a first and second selected registers within the register set. The decoder is further configured to interpret, upon detecting the absence of the three register indicator, the computer instruction as containing no more than two register operands. In one embodiment, the byte length of the computer instruction is variable and the instruction decoder is configured to determine a beginning and ending byte of the computer instruction. In one embodiment, the three register field of the MSR consists of a single three register bit. The state of the three register bit determines the appropriate setting for indicating to the decoder whether to search the computer instruction for a three register indicator. The three register indicator of the computer instruction, if present, is contained within a prefix byte of the computer instruction. In one presently preferred embodiment, the prefix byte precedes an opcode byte of the computer instruction. The first and second source operands, in one embodiment, and the destination operand of the computer instruction are each indicated by 5-bit fields within the computer instruction. In one embodiment, three bits of the 5-bit destination operand are contained within the lowest three bits of a prefix byte of the computer instruction and the remaining two bits of the 5-bit field are contained within the highest two bits of a byte following an opcode byte of the computer instruction. In one embodiment, the three bits of the 5 bit first and second operands are each contained within a byte following an opcode byte of the computer instruction and the remaining two bits of the 5 bit first and second operands are contained within a subsequent byte of the computer instruction.

BRIEF DESCRIPTION OF THE DRAWINGS

Other objects and advantages of the invention will become apparent upon reading the following detailed description and upon reference to the accompanying drawings in which:

FIG. 1 is a block diagram of an x86 instruction format;

FIG. 2 is a block diagram illustrating the individual bits of the MODR/M byte of the computer instruction identified in FIG. 1;

FIG. 3 is a diagram of the SIB byte of the computer instruction of FIG. 1;

FIG. 7 diagrams one embodiment of the computer instruction useful in cooperation with the decoder illustrated with respect to FIG. 6;

Figure 4:
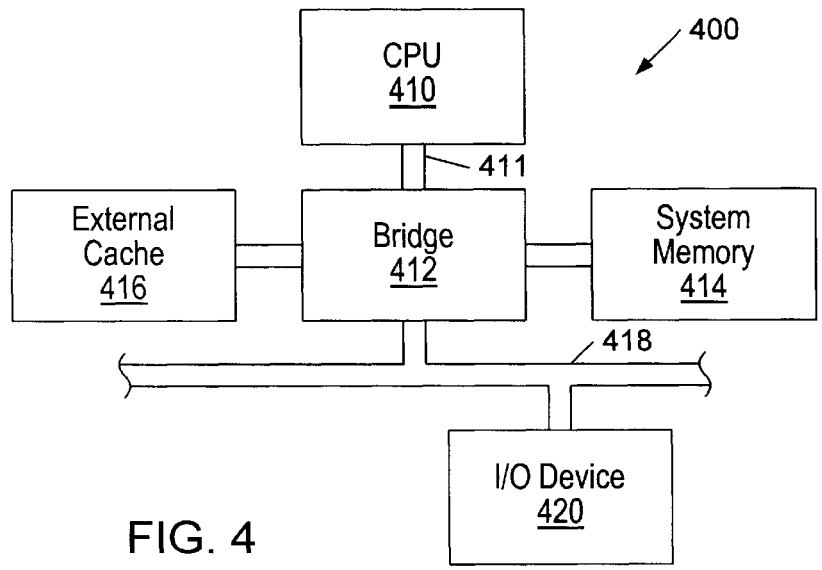
FIG. 4 is a block diagram of a computing system including a processor (CPU) according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 4 represents a simplified block diagram of a computing system 400 including a processor or CPU 410 according to the present invention. CPU 410 is connected to a bridge 412 via a CPU local bus 411. Bridge 412 is responsible for providing an interface between local bus 411 and various peripheral components and busses of the computing system. As such, bridge 412 orchestrates the transfer of data, address, and control signals from various peripheral devices to CPU 410. An integrated bridge such as bridge 412 shown in FIG. 4, includes, in addition to facilities for interfacing local bus 411 with peripheral bus 418, includes facilities for interfacing CPU 410 with an external cache memory 416 as well as the system memory 414. External cache 416 in the preferred embodiment includes a relatively small number of high speed memory devices such as static RAMs. External cache 416 is useful for reproducing a small portion of system memory 414 that has been recently accessed by CPU 410 on the theory that recently accessed information is more likely than other information to be accessed in the near future. System memory 414 includes a relatively large number of slower but less expensive memory devices such as dynamic RAMs. Peripheral interface 418 may comply with any number of industry standard interface busses, including for example, a PCI bus, an ISA, or an EISA bus. I/O device 420 connected to peripheral bus 418 is representative of any number of peripheral devices such as a fax/modem, an audio card, a graphics adapter, or an SCSI disc drive adapter. In one embodiment, CPU 410 is representative of an x86 type processor. For purposes of this disclosure, an x86 type processor is defined as a processor configured to interpret and execute variable length computer instructions such as the computer instruction shown with respect to FIGS. 1–3. An x86 type CPU is further defined by its ability to execute an x86 instruction set.

Figure 5:
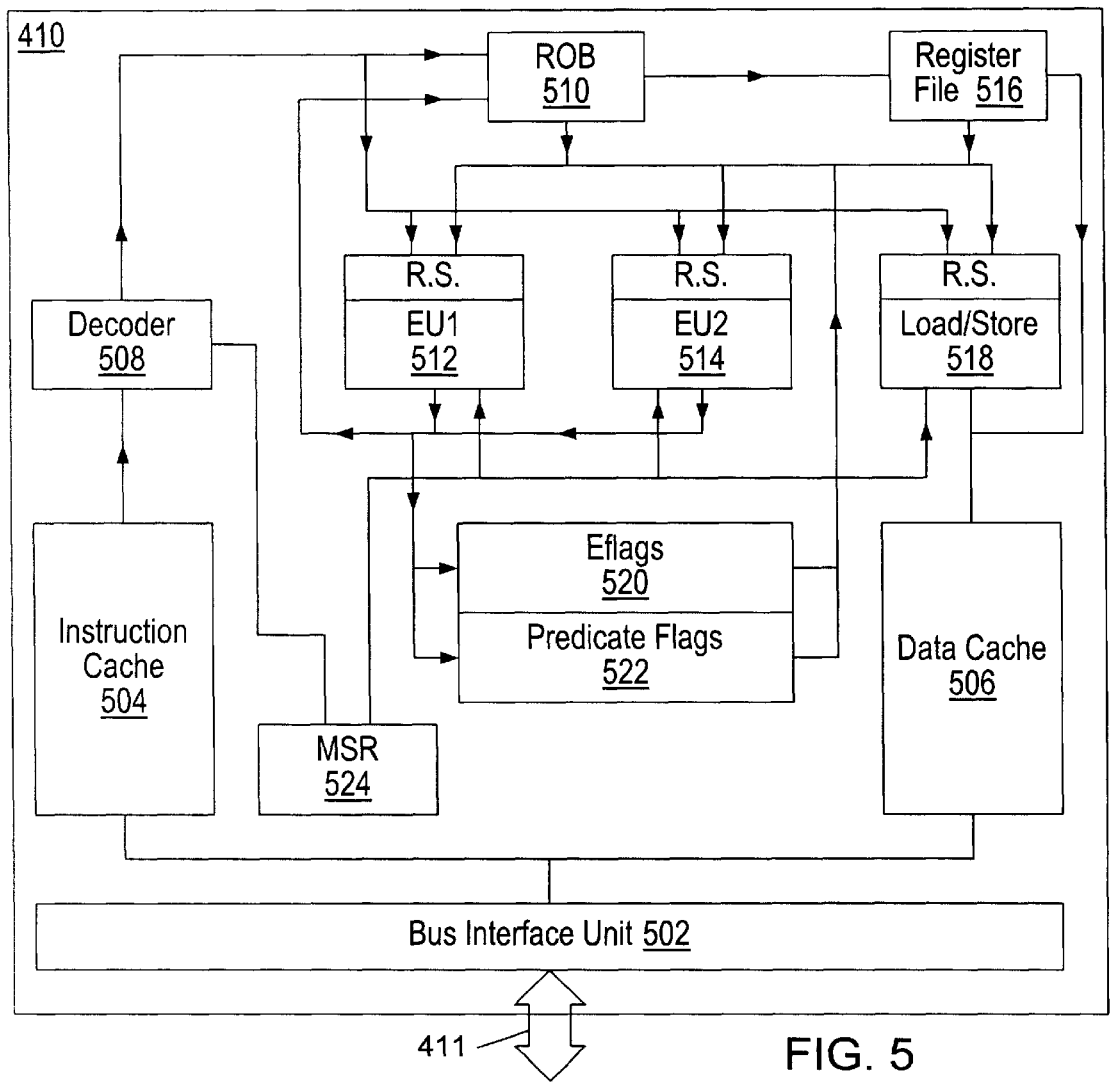
FIG. 5 is a block diagram illustrating elements, in one embodiment, of the CPU of FIG. 1.

Turning now to FIG. 5, various features of processor 410 are shown in FIG. 4. In the embodiment of processor 410 shown in FIG. 5, processor 410 includes a bus interface unit 502 adapted to receive address, data, and control signals from local bus 411 and to transmit the appropriate signals to the subsystems of CPU 410. CPU 410 further includes an instruction cache 504 and a data cache 506 for temporarily storing instructions and data. Instruction cache 504 is coupled to a decoder 508. Decoder 508, among other things, identifies a beginning and an ending of a computer instruction and fetches appropriate operand values for the computer instruction. In the embodiment of CPU 410 shown in FIG. 5, decoder 508 is coupled to a reorder buffer 510 as well as first and second execution units 512 and 514. Reorder buffer 510 is useful in facilitating out of order execution to promote increased instruction parallelism useful for improving performance in a superscalar microprocessor or CPU 410. For purposes of this disclosure, a super scalar microprocessor refers to a microprocessor containing multiple functional units such as first and second execution units 512 and 514 such that the processor is capable of executing multiple instructions in parallel. Execution units 512 and 514 may comprise, for example, arithmetic logic units that manipulate one or more instruction operands to produce a result. In the embodiment of CPU 410 shown in FIG. 5, the results produced by execution units 512 and 514 are routed to reorder buffer 510 so that they may be appropriately assigned to the proper registers within register file 516. Typically, one or more of the source operands for a computer instruction and a destination of the computer instruction are found within register file 516 which provides a low latency or high speed memory storage facility for temporarily storing information that is to be manipulated by the various functional units of CPU 410. In addition to execution units 512 and 514, CPU 410 includes a load store functional unit 518 dedicated to transferring information between register file 516 and a high speed temporary data storage facility such as data cache 506.

It will be appreciated to those skilled in the art that while CPU 410, as shown in FIG. 5, represents a superscalar microprocessor, scalar microprocessors may be equally subject to the improvements represented by the specific embodiments to be discussed below. More particularly, it will be appreciated that processor 410 may benefit from an increased number of registers within register file 516 regardless of whether processor 410 is a superscalar or scalar processor.

In the embodiment shown in FIG. 5, processor 410 includes an EFLAG register 520 and a predicate FLAG register 522. An EFLAG register will be familiar to those familiar with x86 type processor architectures and contains a set of readable FLAGs that are set after the execution of an appropriate computer instruction such that the individual FLAGs within EFLAG register 520 represent various characteristics of a result produced by the execution of the computer instruction. For example, if the execution of a particular instruction produces a result that is equal to zero, a zero FLAG within EFLAG 510 is set accordingly. A subsequent computer instruction may the read the state of a particular FLAG to determine, in a rapid fashion, certain characteristics of the preceding operation. The individual FLAGs within a typical x86 type EFLAG register are particularly useful in computer instructions such as jump instructions which modify the instruction pointer (not shown in the drawings) of CPU 410. The embodiment of CPU 410 shown in FIG. 5 includes a substantial duplicate of EFLAG's register 520 identified as predicate FLAG (PFLAG) register 522. PFLAG register 522, as discussed in greater detail below, may be useful in reducing branch misprediction and therefore may be useful in improving the performance of a pipeline processor such as processor 410. Processor 410 further includes a machine specific register (MSR). An MSR is a register that is not defined in a conventional x86 architecture. Examples of registers found in a conventional x86 architecture can be found in numerous industry publications including, for example, the registers identified in Crawford and Gelsinger, *Programming the 80386* (Sybex 1987). The inclusion of MSR 524 in processor 410 facilitates the implementation of an enhanced instruction set useful for extending capabilities and eliminating the limitations of a conventional x86 processor. To maximize the marketability of processor such as processor 410 which include machine specific registers, such processors typically are designed to be compatible with existing software written for industry standard x86 microprocessors. It is contemplated that declaring the specific fields described below within MSR 524, processor 410 is capable of executing software code written for conventional x86 architectures. Furthermore, while some of the specific embodiments described in the following discussion imply an x86 type instruction format, it is to be understood that, in the broadest sense, the following processor enhancements are generally applicable to a broader class of processors. The presence of MSR 524 within processor 410 implies, at a minimum, an instruction set extension in which the specific fields and bits within MSR 524 are read and written.

While EFLAGS register 520 and PFLAGS register 522 are shown to feed execution units 512 and 514, it is noted that these registers may participate in dependency checking within ROB 510, as may registers within register file 516. Other embodiments of these registers shown in other figures may similarly be dependency checked via ROB 510 or a similar reorder buffer. Reorder buffer tags may be forwarded in place of the FLAGS register values, and the actual values, when computed, may be captured via result forwarding.

Figure 6:
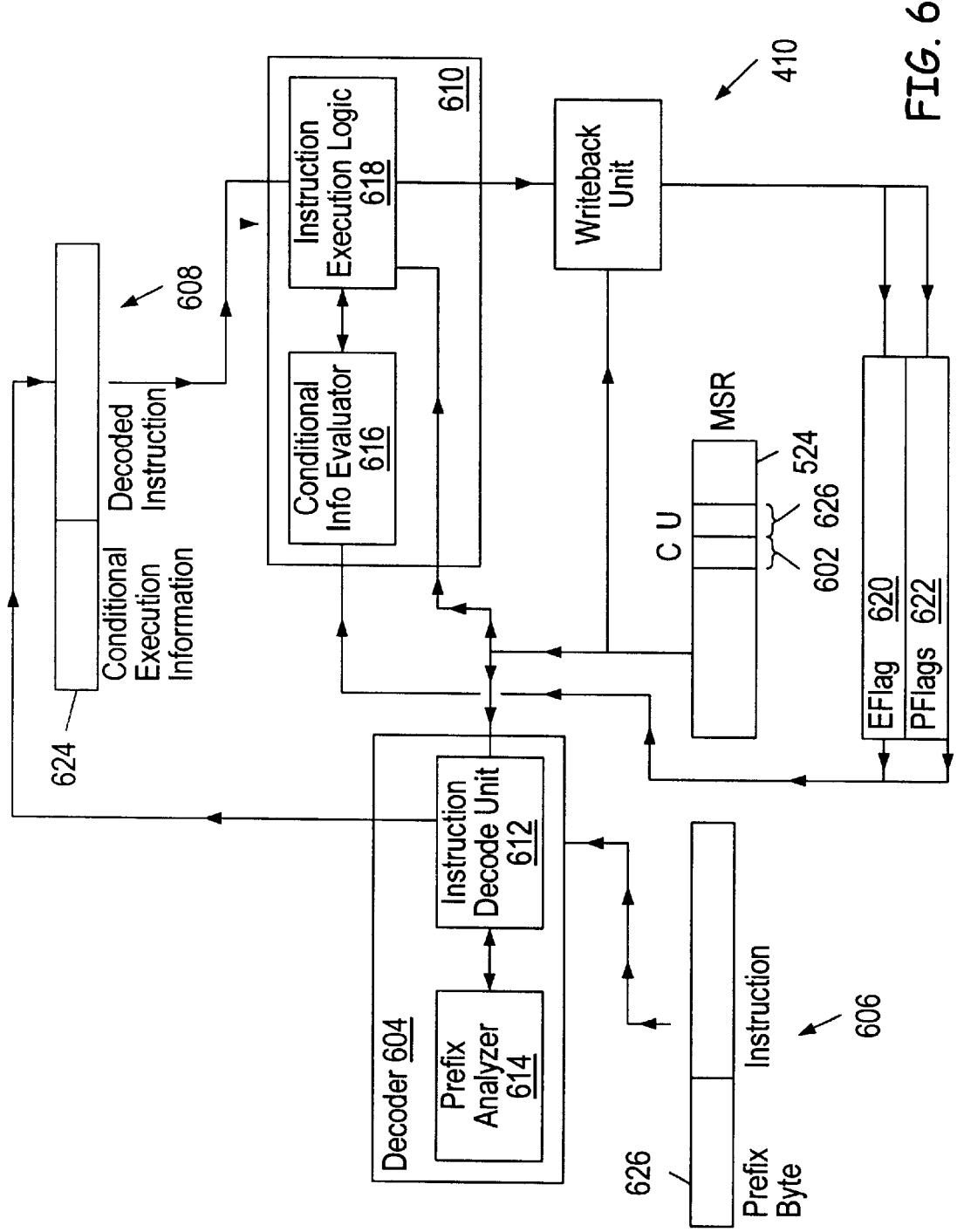
FIG. 6 is a block diagram illustrating particular features of an embodiment of the present invention directed towards predicated execution of computer instructions.

Turning now to FIG. 6, specific details of processor 410 emphasizing one embodiment of the predicated execution extension are shown. In this embodiment, processor 410 includes MSR 524. MSR 524, in the embodiment shown in FIG. 6, includes a predicated execution field 602. The embodiment of processor 410 further includes an instruction decoder 604 which is adapted to receive a computer instruction represented in FIG. 6 by reference numeral 606. Decoder 604 is adapted to produce a decoded instruction represented in FIG. 6 by reference numeral 608 in response to the receipt of computer instruction 606. Decoded instruction 608 is suitable for execution by an execution unit 610 of processor 410. Decoder 604 is coupled to MSR 524 and includes an instruction decode unit. In the predicated execution embodiment of processor 410, decoder 604 is configured to search computer instruction 606 for predicated execution information upon detecting an appropriate setting in the predicated execution field 602 of MSR 524. Decoder 604 is further configured, upon detecting predicated execution information in computer instruction 606, to produce and include additional execution information 624 in decoded instruction 608. In a presently preferred embodiment, the predicated execution information, if present in computer instruction 606, is contained within a prefix byte 626 of computer instruction 606. Prefix bytes will be familiar to those skilled in x86 computer instruction formats. As its name implies, a prefix byte preferably comprises a single byte of information located before the opcode of the computer instruction. In conventional x86 instruction sets, prefix bytes serve a variety of functions including the overriding of default segments and the default operand sizes for a given computer instruction. One embodiment of the present invention contemplates that, when predicated execution field 602 of MSR 524 is set appropriately, a particular prefix or set of prefixes including prefix byte 626 of computer instruction 606 will indicate to decoder 604 that computer instruction 606 contains predicated execution information.

Predicated execution of a computer instruction implies that, prior to actually executing the pending computer instruction, an execution unit of the microprocessor checks a particular condition within the microprocessor to determine if the pending instruction is to be executed. If the condition represented by the predicated execution information in the decoded instruction is false, the execution unit completes the instruction without executing it. In this manner, branch misprediction can be significantly reduced by reducing the number of conditional jump steps within a given portion of computer code. Consider, for example, a typical computer instruction sequence in which a small subroutine comprising three computer instructions is included in a computer sequence. Prior to the brief computer instructions representing the subroutine, a conditional execution step is included in a conventional x86 code segment. If the condition represented by the conditional computer instruction is true at the time the instruction is executed then the program will execute in a linear or a step wise fashion wherein the next computer instruction to be executed is also the next computer instruction found within the instruction cache of the microprocessor. If the condition is untrue, the program branches to computer instruction following the sequence of three computer instructions representing the subroutine. When this jump around between computer instructions occurs, performance penalty is paid in a pipelined architecture because the pipeline, which most likely has been filled with the succeeding computer instructions, must be cleared. In a predicated execution microprocessor, each of the three instructions can be conditionally executed if a condition which is part of the computer instruction itself is appropriately set when execution is to occur.

Returning now to FIG. 6, one embodiment of decoder 604 is shown in which the method of searching computer instructions 606 includes a prefix analyzer 614 coupled to an instruction decode unit 612 of decoder 604. In this embodiment, the predicated execution information is preferably stored in prefix byte 626 to simplify the task of detecting predicated execution information in computer instruction 606. Turning briefly to FIG. 7, one embodiment of a form that is suitable for use with predicated execution extension of processor 410 is represented by the computer instruction format 710. In this format, the prefix byte is evaluated by prefix analyzer 614 which, in its simplest embodiment, comprises a comparator. Prefix analyzer 614 compares the high order 4 bits of prefix byte 626. If the high order 4 bits of prefix byte 626 are equal to a comparator value, instruction decode unit 604 is informed that the instruction includes predicated execution information that should be included in the decoded instruction 608. Referring to FIG. 7, one embodiment of the present invention contemplates that, if prefix byte 626 includes a value in the range of 40H–4fH, then predicated execution is indicated. The four lower bits of prefix bytes 626 are presented in greater detail in table 712 of FIG. 7. Table 712 shows that one of seven condition codes is represented by the least significant 3 bits of prefix bytes 626 (when the most significant 4 bits is equal to a predetermined value). In addition, the implementation shown in format 710 includes a p bit which indicates whether or not the PFLAGs register should be updated following execution of the instruction.

Returning to FIG. 6, it is seen that the depicted embodiment of processor 410 includes a conventional EFLAG register 620 and an additional PFLAG register 622. It is contemplated that PFLAG register 622 contains essentially the same bit fields that are present in EFLAG 620. By including a PFLAG register in this embodiment of processor 410, it is contemplated that greater programming flexibility is permitted by enabling the programmer to insert instruction steps between an instruction designed to set a predicated execution flag and a program step designed to evaluate the predicated flag. Accordingly, one embodiment of processor 410 includes at least one predicated flag 622.

In addition to decoder 604, processor 410 as shown in FIG. 6 includes a first execution unit 610. First execution unit 610 is configured to receive and execute decoded instruction 608. First execution unit 610 is coupled to MSR 524 and is configured to detect and evaluate the additional execution information 624 in decoded instruction 608. Execution unit 610 is configured to perform the detection and evaluation of conditional execution information in decoded instruction 608 only if the predicated execution field 602 of MSR 524 is appropriately set. When decoded instruction 608 is found to contain conditional execution information 624, first execution unit 610 is configured to execute decoded instruction 608 only if a condition represented by conditional execution information 624 is true.

Accordingly, the embodiment of decoder 604 shown in FIG. 6 receives computer instruction 606. A prefix analyzer 614 compares a prefix byte 626 of instruction 606 with a comparator value if an instruction decode unit 612 of decoder 604 detects an appropriate setting in predicated execution field of MSR 524. If prefix byte 626 is found to include an appropriate setting, instruction decode unit 612 includes conditional execution information 624 in the decoded instruction 608. Decoded instruction 608 is routed to execution unit 610 which includes a conditional information evaluator 616. In its simplest embodiment, conditional information evaluator 616 may comprise a simple comparator circuit designed to compare the value of conditional execution information 624 with one or more predetermined values. Conditional information evaluator 616 is coupled to the EFLAG and PFLAG registers 620 and 622 respectively so that conditional information evaluator 616 can produce a true or false signal that is routed to instruction execution logic 618. If the signal sent to instruction execution 618 by condition information evaluatoinsb 616 is false, instruction execution logic 618 retires decoded instruction 608 without execution. If conditional information evaluator 616 sends a true signal to instruction execution logic 618, then decoded instruction 608 is executed in the traditional fashion.

MSR 524 further includes a predication update field which is routed to instruction execution logic 618. If predicated update field 626 is set appropriately, instruction execution logic 618 will set not only EFLAG register 620 appropriately, but also PFLAG register 622 depending upon the result generated by the execution of decoded instruction 608. This PFLAG value may then be used by a subsequent predicated instruction for conditional execution purposes. In the embodiment shown in FIG. 6, execution 610 is coupled to a write back unit designed to form the actual updating of the EFLAG and PFLAG registers if the update field 626 of MSR 524 contains an appropriate value. In a presently preferred embodiment, both the conditional execution field 602 and the predicated update field 626 of MSR 524 comprise a 1 bit field. The status of the predicate FLAG bit, in this embodiment, determines whether the execution unit sets or clears predicate flag 622 upon executing decoded instruction 608.

Those familiar with x86 instruction sets will recognize that the format 710 of an instruction suitable for use with processor 410 as shown in FIG. 6 closely resembles the instruction format of an x86 instruction as shown in FIG. 1. It is contemplated, therefore, that in a presently preferred embodiment, computer instruction 606 is a variable byte length instruction and it is further contemplated that instruction decoder 604 includes an instruction decode unit 612 that is capable of determining a beginning byte and an ending byte of computer instruction 606. The seven conditions labeled as CC1–CC7, in a preferred embodiment, represent the status of either the EFLAGs within EFLAGs register 620 or the PFLAGs within PFLAGs register 622. In the preferred embodiment, processor 410 updates the EFLAG register 620 whenever the PFLAG register 622 are updated. In another embodiment, however, it is contemplated that the PFLAGs may be set independently of the EFLAGs within EFLAGs register 620. In the preferred embodiment, the truth of each of the condition codes CC1 through CC7 depends upon the state of a predicate FLAG 622. In one embodiment, for example, the prefix bytes 40H through 4fH are assigned as the predication execution prefixes. If an instruction 606 includes a prefix byte of 41H, the CC1 condition is checked prior to the execution of decoded instruction 608 and PFLAGs register 622 is not updated by the execution of decoded instruction 608. The CC1 condition may represent; as an example, whether the zero flag (ZF) in PFLAGs register 622 is set. Accordingly, prior to execution decoded instructions 608, instruction execution logic 618 extracts the conditional execution information 624 and routes this information to conditional information evaluator 616. Conditional information evaluator 616, which is coupled to PFLAGs register 622 performs a simple comparison with the state of ZF in PFLAGs register 622 and returns a result of this comparison to instruction execution logic 618. If the result produced by conditional information evaluator 616 indicates that the condition checked was true, i.e., indicates that ZF of PFLAGs register 622 was set, instruction execution logic 618 executes decoded instruction 608. Referring to Table 712 of FIG. 7, it is seen, in this embodiment, that up to 8 different conditions may be checked or monitored. It is further seen from the format indicated by the format of instruction 710, that this embodiment contemplates an instruction format essentially equivalent to the instruction format of a standard x86 instruction as diagrammed in FIG. 1 thereby minimizing the alterations and extensions required to be made in instruction decode unit 612 and instruction execution logic 618.

With the instruction set extensions represented by the preceding discussion, those skilled in microprocessor architecture will appreciate that each instruction of the preexisting instruction set of microprocessor 410 may be executed in four modes: 1. unconditional execution without updating PFLAGs; 2. unconditional execution with PFLAGs updated; 3. conditional execution without updating PFLAGs; and 4. conditional with PFLAGs updated.

Consider, for example, the following segment of code:

```
        I1      CMP CC1
        I2      CMP CC1, target1
        I11
        I12
target1, I3
```

It will be apparent that the above code sequence can result in branch misprediction because it cannot be precisely determined a priori whether I11 or I3 will be executed following execution of I2. When the branch is mispredicted, the processor's pipeline must be cleared, resulting in the execution of one or more no-op cycles. With the predicated execution instruction set, however, branch misprediction is eliminated as follows:

```
I1   CMP__U CC1
I2   CC1_I11
I2.1 CC1_I_I2
I3
```

Where the __U suffix indicates that the predicate flags are updated and the CC#__prefix indicates conditional execution of the associated instruction depending upon the truth of the condition represented by CC#. It should be apparent that the predicated sequence guarantees linear program flow. In other words, in the predicated sequence, I2.1 is guaranteed to be the instruction that will be conditionally executed after execution of I2, which, in turn, is the instruction guaranteed to be conditionally executed after I1. By eliminating branch misprediction, therefore, predicate execution improves system performance. It is also noteworthy that the addition of a predicate flag register insures that the instruction I11 may result in a change to the regular EFLAGs without affecting the conditional execution of instruction I12 which remains dependent solely on the comparison made in I1.

Figure 8:
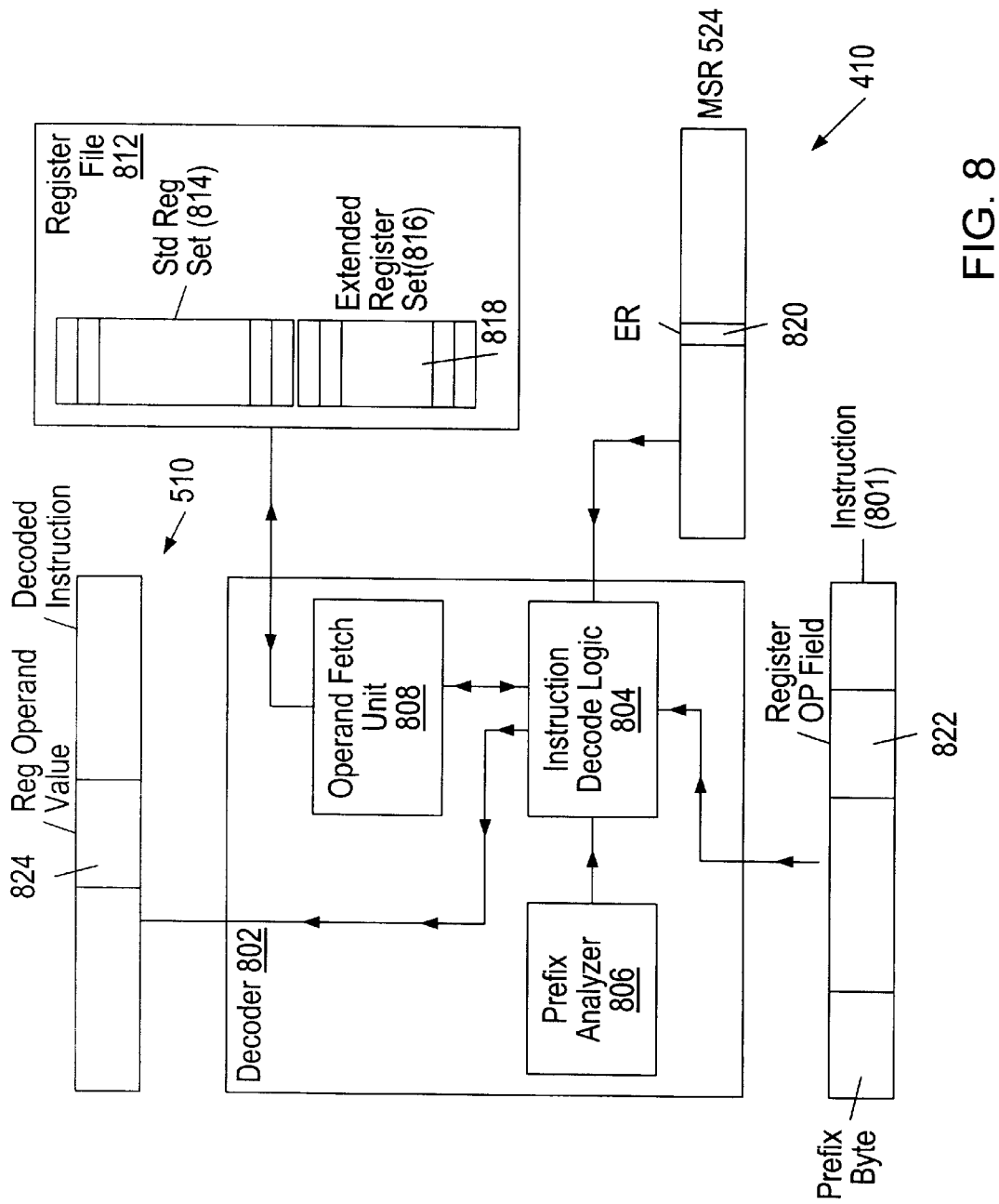
FIG. 8 is a block diagram of various features of one embodiment of the CPU shown in FIG. 4 configured for extended register set operation.

Turning now to FIG. 8, an embodiment of processor 410 useful in facilitating the implementation of extended registers is shown. As will be appreciated to skilled programmers, it is essentially always desirable to have access to a larger number of general purpose registers when writing any significant piece of software. It is further widely known that conventional x86 architectures include a prohibitively limited number of general purpose registers resulting in the frequent retrieval of information from storage locations peripheral to the CPU (e.g., from the external cache or from the system memory). Accordingly, it is desirable to implement an instruction set enhancement to the x86 architecture that enables access to a significantly larger number of general purpose registers without significantly modifying the design of the instruction decoder and other portions of the CPU. FIG. 8 depicts an embodiment of processor 410 emphasizing the extended register enhancement. The embodiment of processor 410 shown in FIG. 8 includes an instruction decoder 802 designed to receive a computer instruction 801. Computer instruction 801 includes at least one register operand field 822. Instruction decoder 802 is adapted to produce a decoded instruction 810 including a register operand value 824 in response to receiving computer instruction 801. Instruction decoder 802 is coupled to MSR 524. The embodiment of MSR 524 shown in FIG. 8, includes an extended register field 820 which, in one presently preferred embodiment, consists of a single extended register bit indicative or whether processor 410 is operating in an extended register mode. Instruction decoder 802 is configured to search computer instruction 801 for an extended register indicator if an appropriate setting is found within extended register field 820 of MSR 524. In other words, decoder 802 interprets instruction 801 as possibly including extended register information if the extended register field of MSR 524 is set appropriately. If the extended register indicator is found within instruction 801, then instruction decoder 802 is informed that extended register set addressing is contained instruction 801. If, on the other hand, the search of instruction 801 by decoder 802 detects the absence of the extended register indicator, decoder 802 is informed that instruction 801 does not contain extended register addressing. Accordingly, decoder 802 is configured to fetch, upon detecting the extended register indicator in instruction 801, a value from a selected register within extended register set 816 of register file 812. Register file 812 includes a standard register set 814 and an extended register set 816. Standard register set 814 includes a plurality of general purpose registers. Extended register set 816 includes all of the registers within standard register set 814 as well as an additional plurality of registers 818. Decoder 802 is further configured to fetch, upon detecting the absence of the extended register indicator within instruction 801, a value from a selected register within standard register set 814.

As with the discussion of the predicated execution enhancements described earlier, instruction decoder 802, in one embodiment, is adapted to receive variable byte length instructions 801. In this embodiment, the instruction decode logic 804 of decoder 802 is configured to determine a beginning byte and an ending byte of instruction 801. In one embodiment, the extended register indicator consists of a pre-determined hexadecimal value stored in a prefix byte of instruction 801. In this embodiment, decoder 802 may be suitably configured with a prefix analyzer 806 coupled to instruction decode logic 804. The prefix analyzer 806, in such an embodiment, consists simply of a comparator that receives the prefix byte of instruction 801 as an input an produces a signal indicative of the comparison between the prefix byte of instruction 801 and the predetermined hexadecimal value. Thus, if the extended register field 820 of MSR 524 is set appropriately, decoder 802 searches instruction 801 for an extended register indicator. If the extended register indicator is found within instruction 801, then the remaining portions of instruction 801 are interpreted by instruction decode logic 804 in a manner somewhat different from the interpretation given to the corresponding portions of instruction 801. If the instruction does not contain the extended register indicator. Instruction decode logic 804 and an operation fetch unit 808 coupled to instruction decode logic 804 ultimately retrieve a value from register file 812 of processor 410. This value is ultimately stored in a register operand value of decoded instruction 810.

Figure 9:
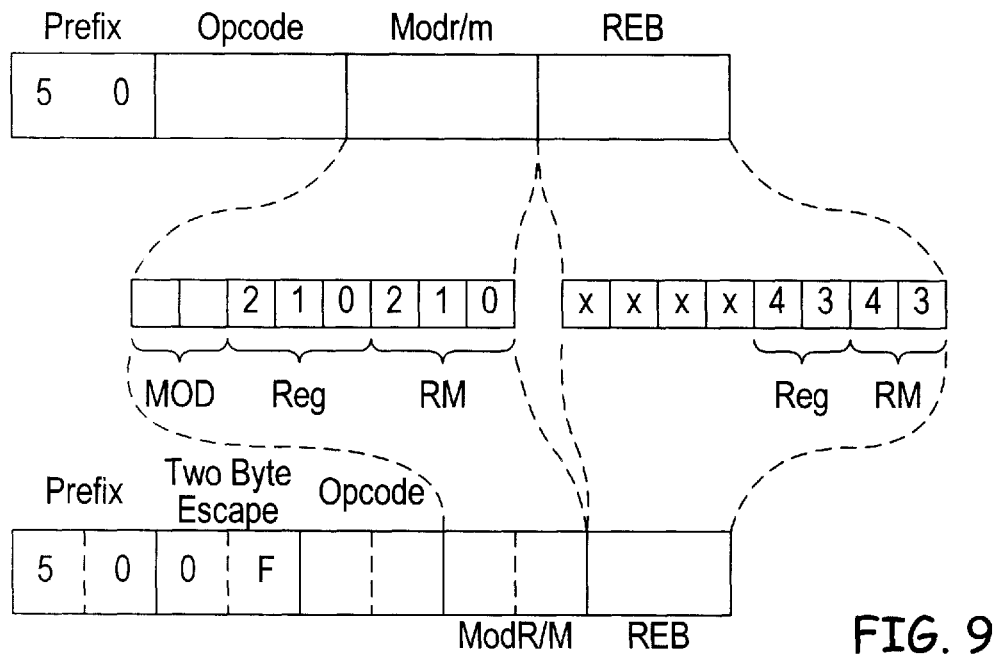
FIG. 9 is a diagram illustrating one embodiment of computer instruction format suitable for operation with the CPU diagrammed in FIG. 8.
Figure 10:
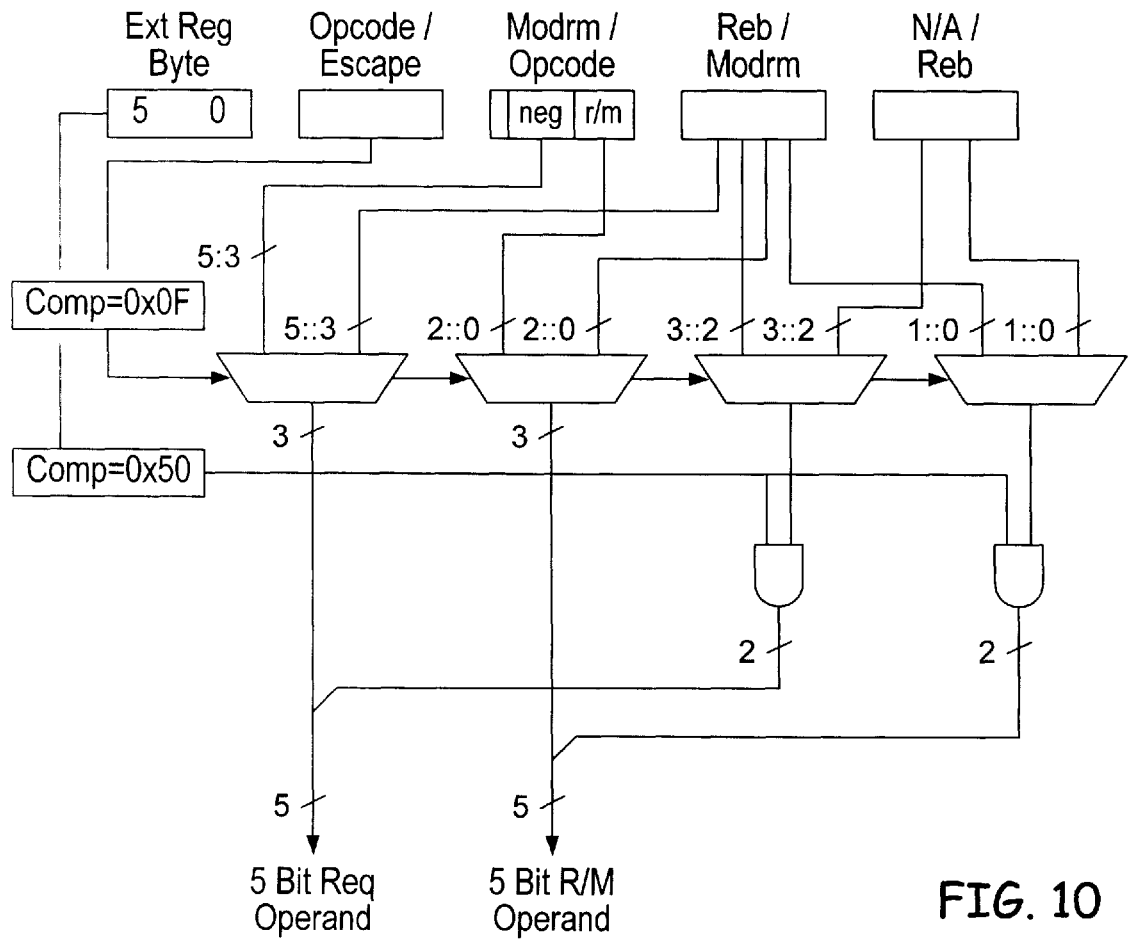
FIG. 10 is a simplified logic diagram illustrating the operation of one embodiment of the extended register CPU of FIG. 8.

Turning to FIG. 9, a format for a suitable instruction for use with the extended register enhancement described is shown. As seen in FIG. 9, the extended register indicator consists of a prefix byte containing the hexadecimal value 50H. The prefix byte is followed by a conventional opcode byte and a MOD R/M byte as described with respect to FIG. 1. To achieve the extended register enhancement, the sib byte of the conventional x86 instruction set has been replaced with a register extension byte (REB) as shown in FIG. 9. The REB byte includes the high order two bits for the register associated with the R/M field and the high order two bits for the register associated with the REG field of the MOD RIM byte. When the prefix byte of instruction 801 contains a value other than 50 or when a prefix byte is lacking altogether, instruction decode logic 802 determines the selected register or registers solely by referring the standard register information contained in the MOD R/M byte. If, on the other hand, the prefix byte of instruction 801 includes the hexadecimal value 50, then instruction decoder 802 interprets instruction 801 as including standard register set information in the MOD R/M byte and extended register information in the succeeding REB byte. FIG. 10 shows a simplified logic diagram indicating one embodiment of a circuit designed to generate the five bit extended register references suggested by the format of the instruction shown in FIG. 9. At the top of FIG. 10, the instruction format is shown. The first byte is the extended register byte containing the hexadecimal value 50. It will be appreciated that in other embodiments, any other suitable predetermined hexadecimal value may be used as the extended register indicator. Following the extended register or prefix byte, the conventional x86 opcode byte is found. Those skilled in the art will appreciate that the conventional x86 instruction set includes a one byte escape code comprising the one byte opcode 0FH. If the opcode byte contains hexadecimals 0F, then the succeeding byte must be interpreted as an opcode in the MOD R/M and REB bytes are found thereafter. The circuit diagram in FIG. 10 incorporates this possibility by comparing the byte immediately following the prefix byte with a hexadecimal 0F value. The result of this comparison is fed to a number of multiplexors to select the appropriate bytes of the instruction from which the register operand fields may be found. FIG. 10 further shows that the prefix byte is compared to a hexadecimal 50 value and the result of this comparison is fed to a pair of AND gates. If the prefix byte is equal to hexadecimal 50 the pair of AND gates generates the high order two bits of the register operand field. If, on the other hand, the prefix byte contains a value other than hexadecimal 50, the corresponding AND gates produce a field of zeros for the most significant bits of the 5 bit register operand field. Thus, in this embodiment, the standard register information is contained in a MOD R/M byte following an opcode byte of computer instruction 801. In addition, the extended register information is contained within an extended register byte following the MOD R/M byte of the computer instruction 801. Accordingly, the standard register information is contained within a three bit field of the MOD R/M byte and the extended register is contained in a two bit field of the extended register byte. Those skilled in the art will appreciate that the addition of the two bit fields in the extended register byte increases the available number of addressable registers by a factor of 4, typically from 8 registers to 32 available registers.

Figure 13:
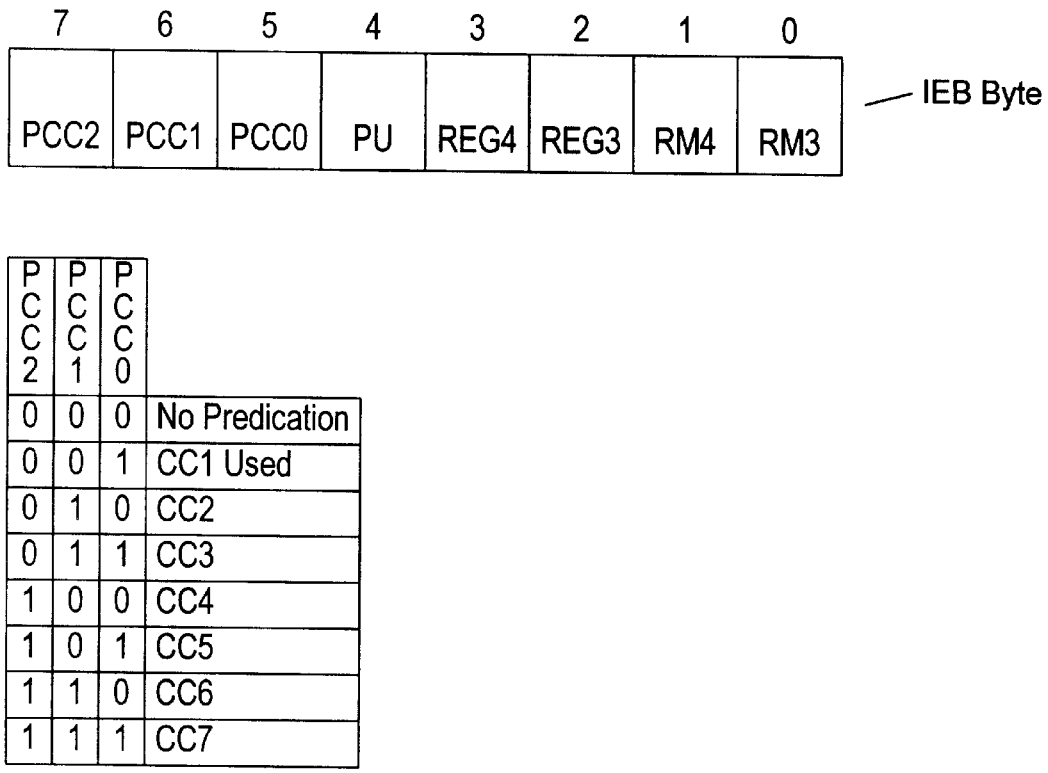
FIG. 13 is a diagram of one embodiment of a computer instruction format useful in conjunction with a central processing unit combining the features of the CPUs of FIG. 6 and FIG. 8.
Figure 13:
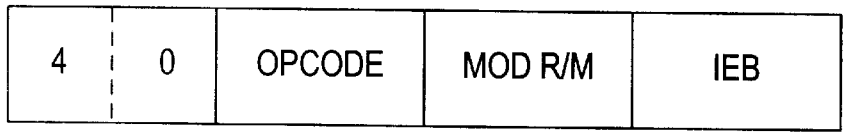

Turning briefly to FIG. 13, a diagram for an embodiment of the present invention incorporating the predicated execution enhancements and the extended register enhancements previously described into a single processor are implemented by the modification of the extended register byte described with respect to FIG. 9. Predicated execution and extended register addressing can be incorporated into a single processor 410 by combining the features of decoder 604 (FIG. 6) and decoder 802 (FIG. 8). In an embodiment of processor 410 designed to be used with the instruction format diagrammed in FIG. 13, the presence of extended register and predicated execution information as indicated by a prefix byte containing a hexadecimal value 40. Other methods of indicating the presence of the extended register information and the predicated execution can be easily accommodated. For example, the prefix byte used to indicate instruction set enhancements may be a different value than hexadecimal 40. In addition, the instruction enhancements may be indicated in any location within the instruction other than the prefix byte. The prefix byte is used in the embodiment shown to simplify the logic required to extract the instruction enhancement indicators. The format of FIG. 13 includes an instruction enhancement byte (IEB byte) which includes information to implement both the extended registers and the conditional execution described previously. Referring specifically to the diagram of the IEB byte shown in FIG. 13, and the underlying table, it is seen that the high order three bits of the IEB byte include the conditional execution information described with respect to FIG. 6. The next most significant bit of IEB byte contains the bit dedicated to indicating whether the predicate flag field will be updated by an executed instruction. The low order four bits include the extended register information including the upper two bits of the R/M register field and the REG register field as described previously with respect to FIG. 8.

Thus, one embodiment of the present invention contemplates a processor for executing computer instructions including enhancements from the conventional x86 architecture including predicated execution and extended register addressing. This embodiment includes a standard register set, an extended register set, a machine specific register, an instruction decoder, and a first execution unit. The standard register set includes a first plurality of registers and the extended register set includes the standard register set and a second plurality of registers. The MSR of this embodiment includes a predicated execution field and an extended register field as described previously. The instruction decoder is configured to search the computer instruction for predicated execution information upon detecting an appropriate setting in the predicated execution field and include predicated execution information in the computer instruction upon detecting the predicated execution indicator. The decoder is further configured to search the computer instruction for an extended register indicator if the extended register field of the MSR contains an appropriate setting. The decoder is further configured to fetch a value from a selected register within the extended register set if the extended register indicator is detected within the instruction. The decoder fetches a value from a register selected from the standard register set if the instruction fails to include the extended register indicator. In the embodiment contemplated by the instruction format diagrammed in FIG. 13, a common indicator may be used to indicate extended register and predicated execution information. In another embodiment not specifically shown in the figures, it is contemplated that the high order four bits of the prefix byte may be used to indicate the presence of extended register information while the lower four bits are used to designate the presence of predicated execution information. It is noted that the embodiment of processor 410 employed to implement the instruction format diagrammed in FIG. 13 precludes the inclusion of the conventional SIB byte of the standard x86 instruction set. Accordingly, it will be appreciated by those knowledgeable of x86 instruction sets that the complex addressing modes which require the presence of an SIB byte may be incompatible with these described instruction set enhancements. It is believed, however, that the instruction set enhancements and the benefits derived therefrom may outweigh the advantages associated with the complex addressing modes of the conventional x86 architecture.

Figure 11:
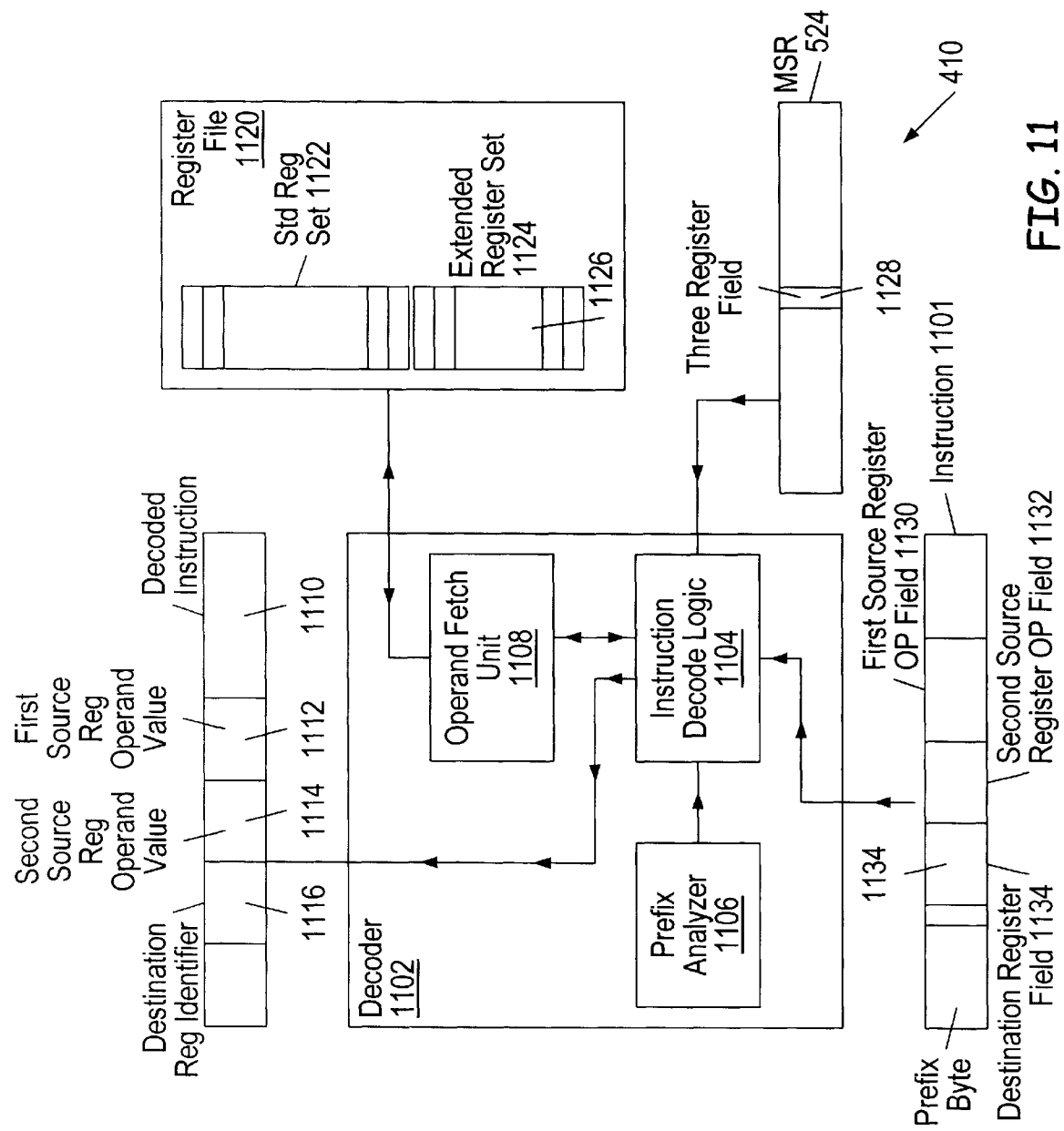
FIG. 11 is a block diagram illustrating various features of one embodiment of the CPU shown in respect to FIG. 4 configured to enable three register instruction set operation.

Turning now to FIG. 11, a third embodiment of processor 410 is described with emphasis on incorporating a 3 register operand extension of the conventional x86 instruction set. The embodiment of processor 410 shown with respect to FIG. 11 includes a register set 1120 including a plurality of registers, a machine specific register 524 including a 3 register field 1128, and an instruction decoder 1102. The instruction decoder 1102 is adapted to receive a computer instruction 1101 and produce a decoded instruction 1110 suitable for execution by an execution unit (not specifically shown in the drawings). Decoder 1102 includes instruction decode logic 1104 coupled to MSR 524 and configured to search instruction 1101 for a three register indicator upon detecting an appropriate setting in three register field 1128 of MSR 524. Instruction decode logic 1104 is further configured to interpret instruction 1101 as containing first and second source operand fields 1130 and 1132 in a destination register field 1134 upon detecting the three register indicator in instruction 1101. If instruction 1101 does not contain the three register indicator, decode logic 1104 interprets the various bits within instruction 1101 as containing references to no more than two register operands.

In one embodiment, instruction 1101 comprises a variable byte length instruction and instruction decode logic 1104 is configured, among other things, to determine a beginning and ending byte of computer instruction 1101. As shown in FIG. 11, decode 1102 includes a prefix analyzer 1106 coupled to instruction decode logic 1104. This embodiment of decoder 1102 is useful in an implementation of the three register enhancement in which the three register indicator is contained within a prefix byte of instruction 1101. In its simplest embodiment, prefix analyzer 1106 may comprise a comparator which simply compares the prefix byte of instruction 1101 with a predetermined value and writes the result of this comparison to instruction decode logic 1104. If the three register indicator is found in prefix analyzer 1106, instruction decode logic 1104 extracts the three fields representing the three register and passes this information to an operand fetching at 1108 coupled to instruction decode logic 1 104. Operand fetch unit 1108 then fetches values for the first and second source operands associated with first and second source register operand fields 1130 and 1132 and passes these operands to decode logic 1104, which includes them in decoded instruction 1110 along with a destination register identifier 1116 that will be used by the execution unit (in any corresponding write back unit of processor 410 to determine into which register the result of the instruction should be stored).

Figure 12:
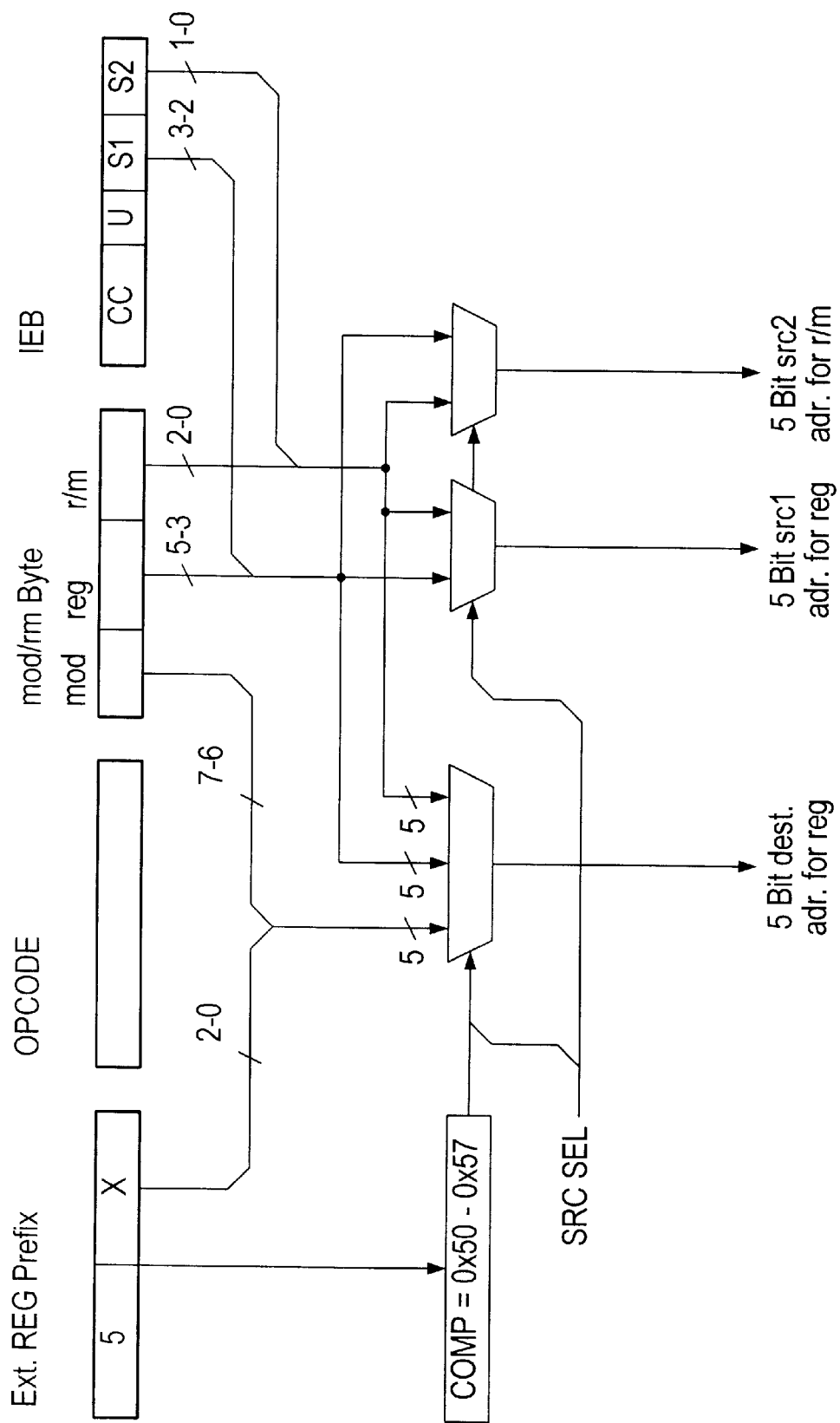
FIG. 12 is a simplified logic diagram illustrating one embodiment of the CPU diagram with respect to FIG. 11.

Turning to FIG. 12, a simplified logic diagram is shown for one implementation of the three register operand enhancements. The embodiment shown in FIG. 12, as will be appreciated to those skilled in the art, also incorporates the extended register addressing and predicated execution enhancements associated with the IEB byte described previously with respect to FIG. 12. It is specifically noted herein that the three register extension may be incorporated without necessarily incorporating extended register addressing or predicated execution information by simply eliminating the IEB byte format from the instruction. In any event, the embodiment shown in FIG. 12 incorporates a prefix value containing the hexadecimal values 50 through 5F. When the upper four bits of the prefix byte indicate the hexadecimal value of 5, the embodiment of decoder 1102 shown in FIG. 12 extracts the low order three bits of the destination field from the low order three bits of the prefix byte. The prefix byte itself is routed to a comparator which effectively determines whether the prefix byte contains a value of hexadecimal 50 through 57. If this comparison results in a logical true value, the destination register address is generated from the low order three bits of the prefix byte. While the register addresses for the first and second source registers are generated from the conventional fields within the MOD R/M byte. If extended register addressing is incorporated into the three register addressing, the high order two bits of the destination register address are extracted from the high order two bits of the MOD R/M byte while the high order two bits for the first and second source registers are taken from the IEB byte as described previously with respect to FIG. 13. In such an embodiment, in which the IEB byte is already present, predicated execution information can be included without significant penalty.

Figure 14:
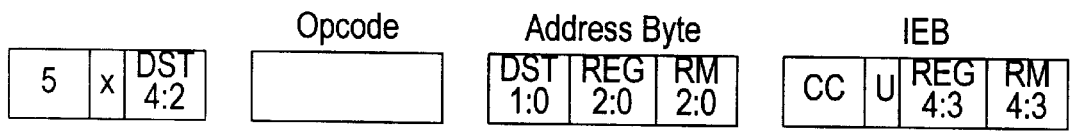
FIG. 14 is a diagram of one embodiment of an instruction format useful in conjunction with a CPU combining the features of the CPUs identified in FIG. 6, FIG. 8 and FIG. 11.

FIG. 14 is a diagram of a format for instruction incorporating all three of the enhancements described previously. Such an embodiment might be accomplished by using a single prefix byte for indicating the absence or presence of three register addressing, extended register addressing, and predicated execution. More likely, however, a first prefix byte will indicate the presence of a predicated execution information at extended register addressing while a second prefix byte will indicate the presence of all three enhancements. This flexibility is believed to be advantageous in that the three register address mode is not compatible with memory addressing because the high order two bits of the MOD R/M byte were required to implement the extension.

Accordingly, the embodiment of the three register operand extension described with respect to FIG. 12 details first and second source operands 1130 and 1132 respectively and a destination register field 1134 are each indicated by 5-bit fields within computer instruction 1101. In one embodiment, three bits of the 5-bit destination operand 1134 are contained within the lowest three bits of a prefix byte of computer instruction 1101. Moreover, two bits of the 5 bit field are contained within the highest two bits of a byte following an opcode byte of instruction 1101. It is further noted that in the embodiment of processor 410 shown in FIG. 11, three bits of the 5-bit first and second operands are contained within a byte following an opcode byte of the computer instruction while the remaining two bits of the 5-bit first and second operands are contained within a subsequent byte of the computer instruction. As discussed previously, one embodiment of the present invention contemplates the simultaneous presence of the three individual instruction set enhancements described herein. In this embodiment, the process of 410 includes each of the features described with respect to FIGS. 6, 8, and 11. More specifically, this integrated processor will include an MSR which includes a predicated execution field, an extended register field, and a three register field. The instruction decoder associated with this integrated processor is configured to search the computer instruction for predicated instruction information upon detecting an appropriate setting and the predicated execution field of the MSR and to include a predicated execution information in the decoded computer instruction upon detecting conditional execution information in the decoded instruction. The instruction decoder of the integrated processor is further configured to fetch a value from a selected register within the extended register set of a register upon detecting an extended register indicator in the computer instruction. If the extended register indicator is absent the value is selected from a register within the standard register set of processor 410. Finally, the decoder is further configured to search the computer instruction for a three register indicator if an appropriate setting is found in the three register field of the MSR. The decoder interprets the computer instruction as containing first and second source operands as well as a destination operand as well as a three register indicator is detected within the computer instruction. The decoder is configured to fetch values from the first and second selective registers for insertion into the decoded instruction. The decoder is further configured to interpret, upon detecting the absence of the three register indicator, the computer instruction as containing no more than two register operands.

It will be appreciated to those skilled in the art that the present invention contemplates significant instruction set enhancements for incorporation into a microprocessor such as a conventional x86 type processor. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A processor for executing a computer instruction, comprising:

a machine specific register (MSR), wherein said MSR includes a predicated execution field;

an instruction decoder adapted to receive said computer instruction and produce a decoded instruction in response thereto, wherein said decoder is coupled to said MSR and further wherein said decoder is configured to search said computer instruction for predicated execution information upon detecting an appropriate setting in said predicated execution field and wherein said decoder is further configured to include, upon detecting said predicated execution information in said computer instruction, conditional execution information in said decoded instruction;

a first execution unit configured to receive and execute said decoded instruction, wherein said first execution unit is coupled to said MSR and configured to detect and evaluate said conditional execution information in said decoded instruction in response to detecting said appropriate setting in said predicated execution field of said MSR and wherein said first execution unit is configured to execute said decoded instruction only if a condition represented by said conditional execution information is true.

2. The processor of claim 1, wherein a byte length of said computer instruction is variable and wherein said instruction decoder is configured to determine a beginning byte and an ending byte of said variable length computer instruction.

3. The processor of claim 1, wherein said predicated execution information is contained within a beginning byte of said computer instruction.

4. The processor of claim 1, wherein said predicated execution field of said MSR consists of a conditional execution bit, wherein said conditional execution information is included in said decoded instruction if said conditional execution bit is set.

5. The processor of claim 1, wherein said processor includes at least one predicate flag, and wherein said first execution unit is configured to set or clear said predicate flag to reflect a characteristic of a result produced by said execution of said decoded instruction if a predicate flag field within said MSR is set appropriately.

6. The processor of claim 5, wherein said predicate flag field consists of a predicate flag bit, wherein the status of said predicate flag bit determines whether said execution unit sets or clears said predicate flag upon executing said decoded instruction.

7. The processor of claim 6, wherein the truth of said condition depends upon the state of said predicate flag, wherein said state of said predicate flag was set during the execution of a previous instruction.

8. A processor for executing a computer instruction including at least one register operand field, said processor comprising:

a standard register set comprising a first plurality of registers;

an extended register set comprising said standard register set and a second plurality of registers;

a machine specific register (MSR), wherein said MSR includes an extended register field; and an instruction decoder adapted to receive said computer instruction and produce a decoded instruction suitable for execution in response thereto, wherein said decoder is coupled to said MSR and wherein said decoder is configured to search said computer instruction for an extended register indicator upon detecting an appropriate setting in said extended register field of said MSR, and wherein said decoder is further configured to fetch, upon detecting said extended register indicator, a value from a selected register within said extended register set, and wherein said decoder is further configured to fetch, upon detecting the absence of said extended register indicator, a value from a selected register within said standard register set.

9. The processor of claim 8, wherein a byte length of said computer instruction is variable and further wherein said instruction decoder is configured to determine a beginning and ending byte of said computer instruction.

10. The processor of claim 8, wherein said extended register field consists of an extended register bit and wherein the status of said extended register bit determines said appropriate setting of said extended register field.

11. The processor of claim 8, wherein said selected register is determined by standard and extended register address information contained in said instruction when said extended indicator register is present in said computer instruction, wherein said selected register is determined solely by said standard register information when said extended register indicator is absent from said computer instruction.

12. The processor of claim 11, wherein said standard register information is contained in a MODR/M byte following an opcode byte of said computer instruction and wherein said extended register information is contained within an extended register byte following said MODR/M byte of said computer instruction.

13. The processor of claim 12, wherein said standard register information is contained within a 3-bit field of said MODR/M byte and further wherein said extended register information is contained in a 2-bit field of said extended register byte.

14. A processor for executing a computer instruction including at least one register operand field, said processor comprising:
  a register set comprising a plurality of registers;
  a machine specific register (MSR), wherein said MSR includes a three register field; and
  an instruction decoder adapted to receive said computer instruction and produce a decoded instruction suitable for execution in response thereto, wherein said decoder is coupled to said MSR and wherein said decoder is configured to search said computer instruction for a three register indicator upon detecting an appropriate setting in said three register field of said MSR, and wherein said decoder is further configured to interpret, upon detecting said three register indicator, said computer instruction as containing first and second source operands and a destination operand and to fetch values from a first and second selected register within said register set, and wherein said decoder is further configured to interpret, upon detecting the absence of said three register indicator, said computer instruction as containing no more than two register operands.

15. The processor of claim 14, wherein a byte length of said computer instruction is variable and further wherein said instruction decoder is configured to determine a beginning and ending byte of said computer instruction.

16. The processor of claim 14, wherein said three register field of said MSR consists of a three register bit, wherein a state of said three register bit determines said appropriate setting.

17. The processor of claim 14, wherein said three register indicator of said computer instruction, if present, is contained within a prefix byte of said computer instruction wherein said prefix byte precedes an opcode byte.

18. The processor of claim 14, wherein said first and second source operands and said destination operand of said computer instruction are each indicated by 5-bit fields within said computer instruction.

19. The processor of claim 12, wherein 3 bits of said 5-bit destination operand are contained within the lowest 3 bits of a prefix byte of said computer instruction and further wherein 2 bits of said 5-bit field are contained within the highest two bits of a byte following an opcode byte of said computer instruction.

20. The processor of claim 12, wherein 3 bits of said 5-bit first and second operands are contained within a byte following an opcode byte of said computer instruction and further wherein 2 bits of said 5-bit first and second operands are contained within a subsequent byte of said computer instruction.

21. A processor for executing a computer instruction, comprising
  a standard register set comprising a first plurality of registers;
  an extended register set comprising said standard register set and a second plurality of registers;
  a machine specific register (MSR), wherein said MSR includes a predicated execution field and a extended register field;
  an instruction decoder adapted to receive said computer instruction and produce a decoded instruction in response thereto, wherein said decoder is coupled to said MSR and further wherein said decoder is configured to search said computer instruction for predicated execution information upon detecting an appropriate setting in said predicated execution field and wherein said decoder is further configured to include, upon detecting said predicated execution information in said computer instruction, conditional execution information in said decoded instruction, wherein said decoder is further configured to search said computer instruction for an extended register indicator upon detecting an appropriate setting in said extended register field of said MSR, and wherein said decoder is further configured to fetch, upon detecting said extended register indicator, a value from a selected register within said extended register set, and wherein said decoder is further configured to fetch, upon detecting the absence of said extended register indicator, a value from a selected register within said standard register set; and
  a first execution unit configured to receive and execute said decoded instruction, wherein said first execution unit is coupled to said MSR and configured to detect and evaluate said conditional execution information in said decoded instruction in response to said appropriate setting in said predicated execution field of said MSR and wherein said first execution unit is configured to execute said decoded instruction only if a condition represented by said conditional execution information is true.

22. A processor for executing a computer instruction including at least one register operand field, said processor comprising
  a standard register set comprising a first plurality of registers;
  an extended register set comprising said standard register set and a second plurality of registers;
  a machine specific register (MSR), wherein said MSR includes a predicated execution field, an extended register field, and a three register field;
  an instruction decoder adapted to receive said computer instruction and produce a decoded instruction in response thereto, wherein said decoder is coupled to said MSR and further wherein said decoder is configured to search said computer instruction for predicated execution information upon detecting an appropriate setting in said predicated execution field and wherein said decoder is further configured to include, upon detecting said predicated execution information in said computer instruction, conditional execution information in said decoded instruction; wherein said instruction decoder is further configured to search said computer instruction for an extended register indicator upon detecting an appropriate setting in said extended register field of said MSR, and wherein said decoder is further configured to fetch, upon detecting said extended register indicator, a value from a selected register within said extended register set, and wherein said decoder is further configured to fetch, upon detecting the absence of said extended register indicator, a value from a selected register within said standard register set; and further wherein said instruction decoder is still further configured to search said computer instruction for a three register indicator upon detecting an appropriate setting in said three register field of said MSR, and wherein said decoder is further configured to interpret, upon detecting said three register indicator, said computer instruction as containing first and second source operands and a destination operand and to fetch values from a first and second selected register within said extended register set, and wherein said decoder is further configured to interpret, upon detecting the absence of said three register indicator, said computer instruction as containing no more than two register operands; and a first execution unit configured to receive and execute said decoded instruction, wherein said first execution unit is coupled to said MSR and configured to detect and evaluate said conditional execution information in said decoded instruction in response to said appropriate setting in said predicated execution field of said MSR and wherein said first execution unit is configured to execute said decoded instruction only if a condition represented by said conditional execution information is true.

* * * * *